(12) United States Patent
Lee

(10) Patent No.: US 12,223,142 B2
(45) Date of Patent: Feb. 11, 2025

(54) TOUCH SENSING DEVICE AND TOUCH SENSING METHOD

(71) Applicant: LX SEMICON CO., LTD., Daejeon (KR)

(72) Inventor: Young Eun Lee, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/509,988

(22) Filed: Nov. 15, 2023

(65) Prior Publication Data

US 2024/0160319 A1    May 16, 2024

(30) Foreign Application Priority Data

Nov. 15, 2022  (KR) .......................... 10-2022-0152512

(51) Int. Cl.
*G06F 3/041* (2006.01)
*G06F 3/044* (2006.01)

(52) U.S. Cl.
CPC ........ *G06F 3/04186* (2019.05); *G06F 3/0446* (2019.05)

(58) Field of Classification Search
CPC .......................... G06F 3/04186; G06F 3/0446
See application file for complete search history.

(56) References Cited

U.S. PATENT DOCUMENTS

| | | | |
|---|---|---|---|
| 10,444,820 B2 * | 10/2019 | Liu | G06F 3/04166 |
| 11,256,367 B2 * | 2/2022 | Garg | G06F 3/04186 |
| 2019/0079576 A1 * | 3/2019 | Liu | G06F 3/04166 |
| 2021/0096725 A1 * | 4/2021 | Garg | G06F 3/0446 |

* cited by examiner

*Primary Examiner* — Peter D McLoone
(74) *Attorney, Agent, or Firm* — ROTHWELL, FIGG, ERNST & MANBECK, P.C.

(57) ABSTRACT

In an aspect of the present disclosure, a touch sensing device is provided. The touch sensing device includes: a first circuit configured to supply a driving signal to a touch electrode of a panel; a second circuit configured to sense a change in capacitance of the touch electrode caused by a user touch; and a third circuit configured to: calculate a touch coordinate based on the sensed capacitance change; determine a touch area based on the touch coordinate; and determine the user touch as either a normal touch or a grip touch based on a touch ratio between touch nodes placed on each of a plurality of lines of the panel and the touch area.

21 Claims, 13 Drawing Sheets

TOUCH SENSING DEVICE AND TOUCH SENSING METHOD

CROSS REFERENCED APPLICATION(S)

Pursuant to 35 U.S.C. § 119(a), this application claims the benefit of earlier filing date and right of priority to Korean Application No. 10-2022-0152512, filed on Nov. 25, 2022, the contents of which are hereby incorporated by reference herein in their entirety.

BACKGROUND OF THE DISCLOSURE

Field of the Disclosure

The present disclosure relates to a touch sensing device and touch sensing method.

Discussion of the Related Art

As the information society advances, the demand for display devices to display images has been increasing in various forms. Recently, various types of display devices such as Liquid Crystal Display (LCD) devices and Organic Light Emitting Display (OLED) devices have been used.

In recent times, there has been a widespread use of display devices equipped with touch panels capable of detecting touch inputs from user's fingers or stylus pens, departing from conventional input methods such as buttons, keyboards, and mice. These display devices equipped with touch panels include touch sensing devices to accurately detect the presence of a touch and the coordinates thereof (i.e., touch position).

The display devices equipped with touch panels may often experience instances where users touch the edge area thereof in order to hold the devices. These touches for gripping the devices may be misinterpreted as actual touches despite not being the actual touches.

SUMMARY OF THE DISCLOSURE

The present disclosure is aimed at addressing the aforementioned issues. That is, the present disclosure is to provide a touch sensing device and touch sensing method for preventing touch malfunctions.

To achieve these objects and other advantages and in accordance with the purpose of the disclosure, as embodied and broadly described herein, there is provided a touch sensing device. The touch sensing device includes: a first circuit configured to supply a driving signal to a touch electrode of a panel; a second circuit configured to sense a change in capacitance of the touch electrode; and a third circuit configured to: calculate a touch coordinate based on the sensed capacitance change; determine a touch area based on the touch coordinate; and determine a user touch as either a normal touch or a grip touch based on a touch ratio between touch nodes placed on each of a plurality of lines of the panel and the touch area.

In another aspect of the present disclosure, there is provided a touch sensing method. The touch sensing method includes: supplying a driving signal to a touch electrode of a panel; sensing a change in capacitance of the touch electrode caused by a user touch; calculating a touch coordinate based on the sensed capacitance change; and determining the user touch as either a normal touch or a grip touch based on a touch ratio between touch nodes placed on each of a plurality of lines of the panel and a touch area.

According to the present disclosure, touch types may be determined based on the touch ratio between first and second lines even if a touch does not have a large area, thereby identifying the touch intended by users more accurately. Accordingly, the present disclosure may prevent touch malfunctions.

According to the present disclosure, touch situations may be determined based on history information per frame, thereby stably providing touch information even if data suddenly changes.

Effects obtainable from the present disclosure may be non-limited by the above-mentioned effects. Other unmentioned effects can be clearly understood from the following description by those having ordinary skill in the technical field to which the present disclosure pertains.

BRIEF DESCRIPTION OF THE DRAWINGS

The present disclosure will become more fully understood from the detailed description given herein below and the accompanying drawings, which are given by illustration only, and thus are not limitative of the present disclosure.

DETAILED DESCRIPTION OF THE DISCLOSURE

Figure 1:
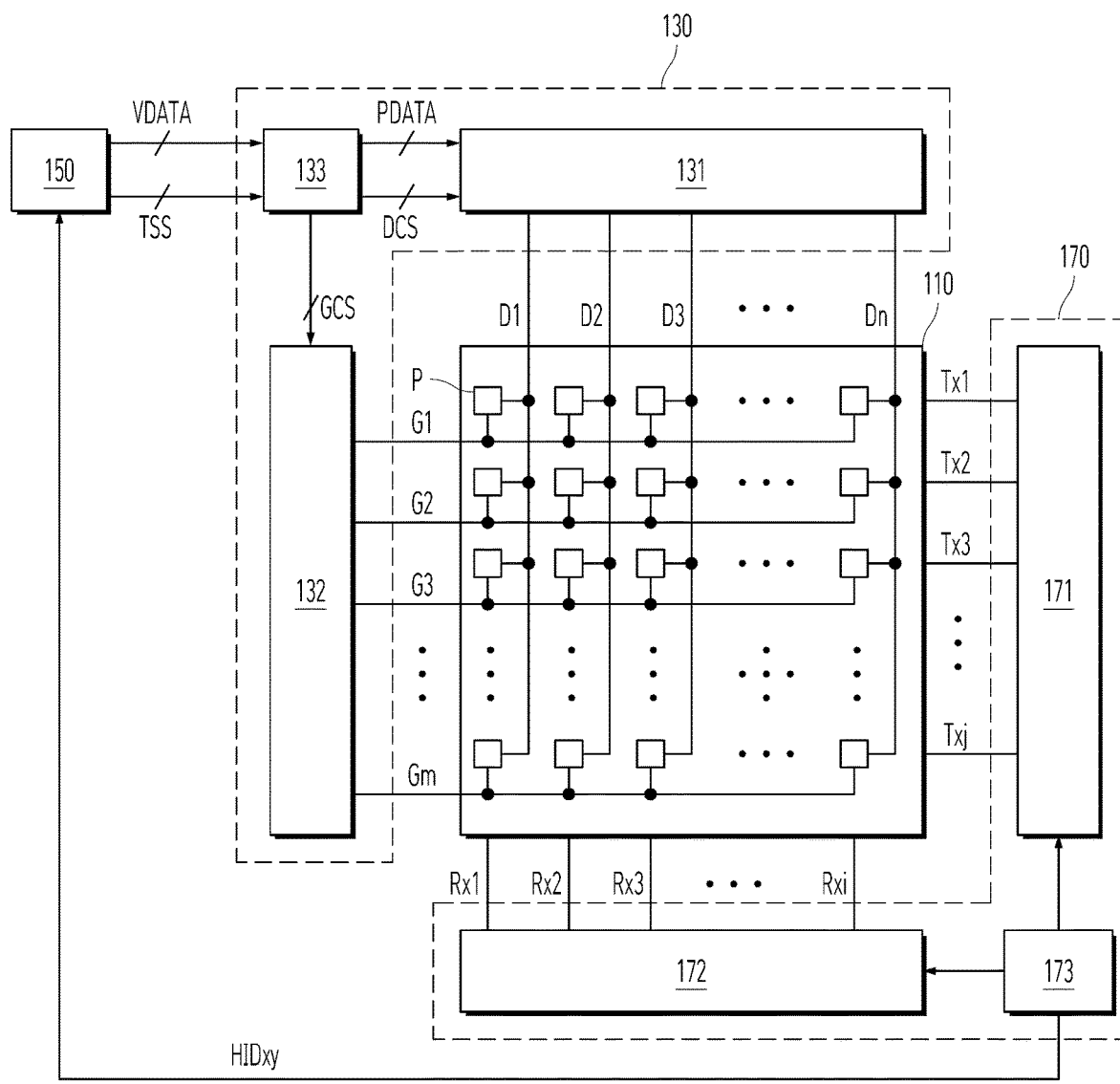
FIG. 1 is a block diagram illustrating a display device according to an embodiment of the present disclosure.

Throughout the specification, like reference numerals are used to refer to substantially the same components. In the following description, detailed descriptions of components and features known in the art may be omitted if they are not relevant to the core configuration of the present disclosure. The meanings of terms used in this specification are to be understood as follows.

As used herein, the terms "includes," "has," "comprises," and the like should not be construed as being restricted to the means listed thereafter unless specifically stated otherwise. Where an indefinite or definite article is used when referring to a singular noun e.g., "a," "an," or "the," this includes a plural of that noun unless something else is specifically stated.

In describing temporal relationships, terms such as "after," "subsequent to," "next to," "before," and the like may include cases where any two events are not consecutive, unless the term "immediately" or "directly" is explicitly used.

While the terms first, second, and the like are used to describe various elements, the elements are not limited by these terms. These terms are used merely to distinguish one element from another. Accordingly, a first element referred to herein may be a second element within the technical idea of the present disclosure.

It should be understood that the term "at least one" includes all possible combinations of one or more related items. For example, the phrase "at least one of the first, second, and third items" may mean each of the first, second, or third items, as well as any possible combination of two or more of the first, second, and third items.

Hereinafter, embodiments of the present disclosure will be described in detail with reference to the attached drawings.

FIG. 1 is a block diagram illustrating a display device according to an embodiment of the present disclosure.

A display device 100 according to an embodiment of the present disclosure may function as a display, which may be implemented as a flat-panel display device such as a Liquid Crystal Display (LCD) device or an Organic Light Emitting Diode (OLED) device. In the following embodiments, it is assumed that the display device 100 according to the embodiment of the present disclosure is implemented as an OLED display device, but it should be noted that the present disclosure is not limited thereto.

As illustrated in FIG. 1, the display device 100 according to the present disclosure includes a panel 110, a host system 150, a display driver 130 for displaying images on the panel 110, and a touch sensing device 170 for sensing touches on the panel 110.

The panel 110 may include a display panel and a touch panel. The touch panel may be integrated into the display panel. For example, the touch panel may be integrated into the display panel as follows: on-cell type or in-cell type. However, the present disclosure is not limited thereto. That is, the touch panel may also be provided as a physically separate component, instead of being built into the display panel.

The panel 110 includes a display area where a plurality of pixels P are provided to display an image. The panel 110 includes a plurality of data lines D1 to Dn (where n is a positive integer greater than 2) and a plurality of gate lines G1 to Gm (where m is a positive integer greater than 2) as well as the plurality of pixels P.

A data signal is input to each of the plurality of data lines D1 to Dn, and a gate signal is input to each of the plurality of gate lines G1 to Gm. The plurality of data lines D1 to Dn and the plurality of gate lines G1 to Gm are arranged such that they intersect with each other on a substrate to define the plurality of pixels P. Each of the plurality of pixels P may be connected to any one of the plurality of data lines D1 to Dn and any one of the plurality of gate lines G1 to Gm.

Each of the plurality of pixels P may include: a driving transistor; a scan transistor that turns on in response to a gate signal from the gate lines G1 to Gm and supplies data voltage from the data lines D1 to Dn to the gate electrode of the driving transistor; an OLED that emits light depending on the current between the drain and source of the driving transistor; and a capacitor for storing the voltage of the gate electrode of the driving transistor. Accordingly, each of the plurality of pixels P may emit light based on the current supplied to the OLED.

In the panel 110, first and second touch electrodes may be formed in addition to the data lines D1 to Dm and the gate lines G1 to Gm. The first touch electrodes may be formed such that the first touch electrodes intersect the second touch electrodes. The first touch electrodes may be connected to the touch sensing device 170 through first touch lines Tx1 to Txj (where j is a positive integer greater than or equal to 2). The second touch electrodes may be connected to the touch sensing device 170 through second touch lines Rx1 to Rxi (where i is a positive integer greater than or equal to 2). A touch sensor may be disposed at each intersection of the first and second touch electrodes. The touch sensor according to an embodiment of the present disclosure may be implemented with mutual capacitance or self-capacitance.

To display an image on the panel 110, the display driver 130 supplies a data signal to the plurality of pixels P included in the panel 110. To this end, the display driver 130 may include a data driving circuit 131, a gate driving circuit 132, and a timing controller 133.

The data driving circuit 131 receives pixel data PDATA and a data control signal DCS from the timing controller 133. The data driving circuit 131 converts the digital pixel data PDATA into an analog positive/negative polarity data signal based on the data control signal DCS and supplies the analog positive/negative polarity data signal to the pixels P through the plurality of data lines D1 to Dn.

The gate driving circuit 132 receives a gate control signal GCS from the timing controller 133. The gate driving circuit 132 supplies gate signals to the plurality of gate lines G1 to Gm based on the gate control signal GCS. Specifically, the gate driving circuit 132 generates a gate signal (or scan signal) synchronized to a data signal under the control of the timing controller 133. Then, the gate driving circuit 132 supplies the generated gate signal to the gate lines G1 to Gm sequentially by shifting the generated gate signal.

The timing controller 133 receives digital video data VDATA and timing signals TSS from the host system 150. The timing signals TSS include a reference clock signal (e.g., dot clock), a vertical synchronization signal, a horizontal synchronization signal, a data enable signal, etc. The vertical synchronization signal refers to a signal that defines one frame period. The horizontal synchronization signal refers to a signal that defines one horizontal period necessary to supply data signals to pixels P positioned on one horizontal line of the panel 110. The data enable signal refers to a signal that defines a period during which valid data is input. The dot clock refers to a signal that repeats at a predetermined short interval.

The timing controller 133 may include a data processor (not shown) that generates the pixel data PDATA, data control signal DCS, and gate control signal GCS based on the digital video data VDATA and timing signals TSS. To control the operation timings of the data driving circuit 131 and gate driving circuit 132, the data processor of the timing controller 133 may generate the data control signal DCS for controlling the operation timing of the data driving circuit 131 and the gate control signal GCS for controlling the operation timing of the gate driving circuit 132 based on the timing signals TSS.

Additionally, the data processor of the timing controller 133 may align the digital video data VDATA to match the structure of the pixels P formed in the panel 110 and convert the digital video data VDATA into the pixel data PDATA.

During the display driving period, the timing controller 133 outputs the pixel data PDATA and data control signal DCS to the data driving circuit 131 and outputs the gate control signal GCS to the gate driving circuit 132.

To receive input video, the host system 150 may be implemented as a television system, navigation system, set-top box, DVD player, Blu-ray player, electronic whiteboard, kiosk system, personal computer (PC), home theater system, broadcast receiver, phone system, and so on. The host system 150, including a System on Chip (SoC) with a built-in scaler, converts the digital video data VDATA of the input video into a format suitable for display on the panel 110. The host system 150 transmits the digital video data VDATA and timing signals TSS to the timing controller 133.

The touch sensing device 170 supplies a driving signal to the first touch electrodes through the first touch lines Tx1 to Txj and senses changes in the capacitance of each touch sensor through the second touch lines Rx1 to Rxi. That is, the first touch lines Tx1 to Txj may be transmission (Tx) lines that supply the driving signal, and the second touch lines Rx1 to Rxi may be reception (Rx) lines that sense the changes in the capacitance of each touch sensor.

The touch sensing device 170 may include a first circuit 171, a second circuit 172, and a third circuit 173. The first circuit 171, the second circuit 172, and the third circuit 173 may be integrated into one Read-Out Integrated Circuit (ROIC), but the present disclosure is not necessarily limited thereto.

The first circuit 171 supplies the driving signal to the first touch lines Tx1 to Txj, and the second circuit 172 receives the changes in the capacitance of the touch sensors through the second touch lines Rx1 to Rxi. The second circuit 172 samples the changes in the capacitance of the touch sensors received through the second touch lines Rx1 to Rxi, converts the capacitance changes into touch raw data, which is digital data, and then outputs the data.

The third circuit 173 generates timing control signals to control the operation timings of the first circuit 171 and second circuit 172. In addition, the third circuit 173 may determine the presence of a touch and the coordinate thereof. The third circuit 173 may output touch coordinate data HIDxy, which includes touch coordinate(s), to the host system 150.

The host system 150 may analyze the touch coordinate data HIDxy received from the third circuit 173 and execute an application program associated with the coordinate of the user's touch. The host system 150 may transmit the digital video data VDATA and timing signals TSS to the timing controller 133 depending on the executed application program.

The touch sensing device 170 may be a separate component from the data driving circuit 131 and gate driving circuit 132. In other words, the touch sensing device 170 may be provided as a separate driving chip external to the data driving circuit 131 and gate driving circuit 132. However, the present disclosure is not limited thereto. Depending on the implementation, the touch sensing device 170 may also be implemented as an internal component of a driving Integrated Circuit (IC) that includes at least one of the data driving circuit 131 and the gate driving circuit 132.

In particular, the touch sensing device 170 according to the present disclosure may identify normal and grip touches based on the touch ratio of touch nodes placed on each of a plurality of lines in the edge area, in addition to the touched region.

Conventional touch sensing devices identify normal and grip touches based on touched regions. The conventional touch sensing device identifies a grip touch if the touched region exceeds a threshold. If the touched region is smaller than or equal to the threshold, the conventional touch sensing device identifies a normal touch and outputs touch information thereon. In some cases, the grip touch may not exceed the threshold within one frame. In this case, the conventional touch sensing devices may consider the grip touch as the normal touch because the touched region is smaller than or equal to the threshold. Even if grip touch conditions are satisfied, the conventional touch sensing device may identify such a touch as the normal touch. In other words, the conventional touch sensing device may fail to identify the corresponding touch as the grip touch.

The touch sensing device 170 according to the present disclosure may accurately identify a touch intended by the user by adding additional conditions in addition to the touched region. Hereinafter, the configuration of the touch sensing device 170 according to the present disclosure will be described in more detail with reference to FIGS. 2 to 6.

Figure 2:
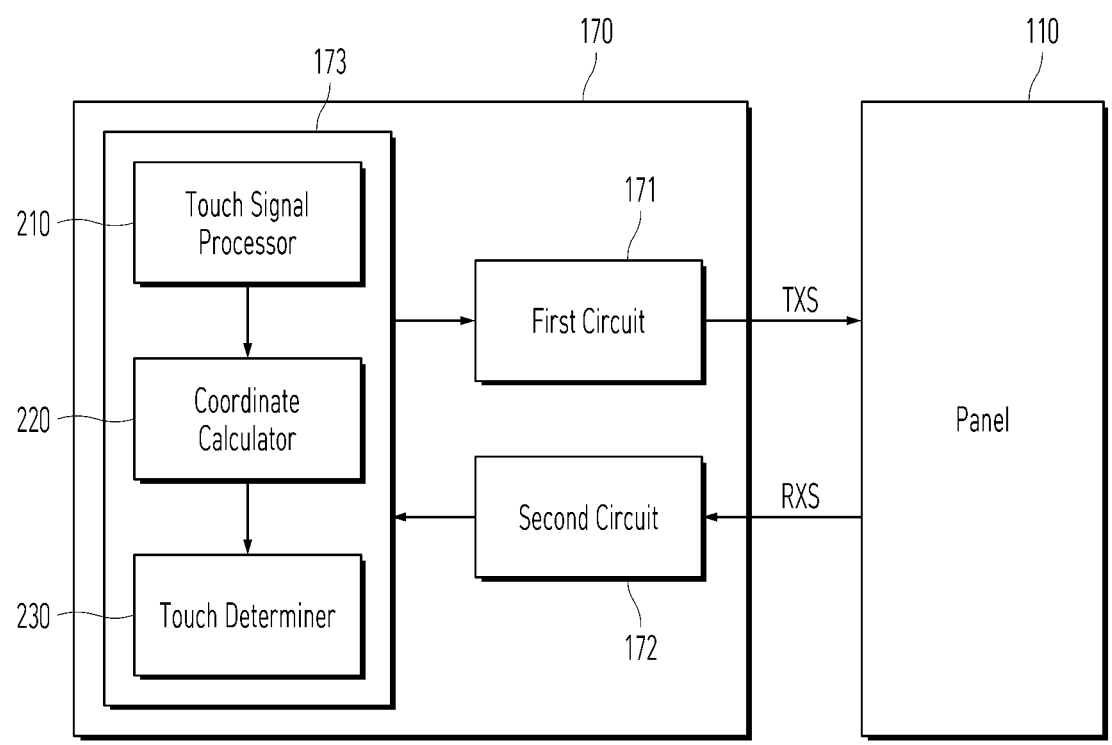
FIG. 2 is a block diagram schematically illustrating the configuration of a touch sensing device according to the present disclosure.
Figure 3:
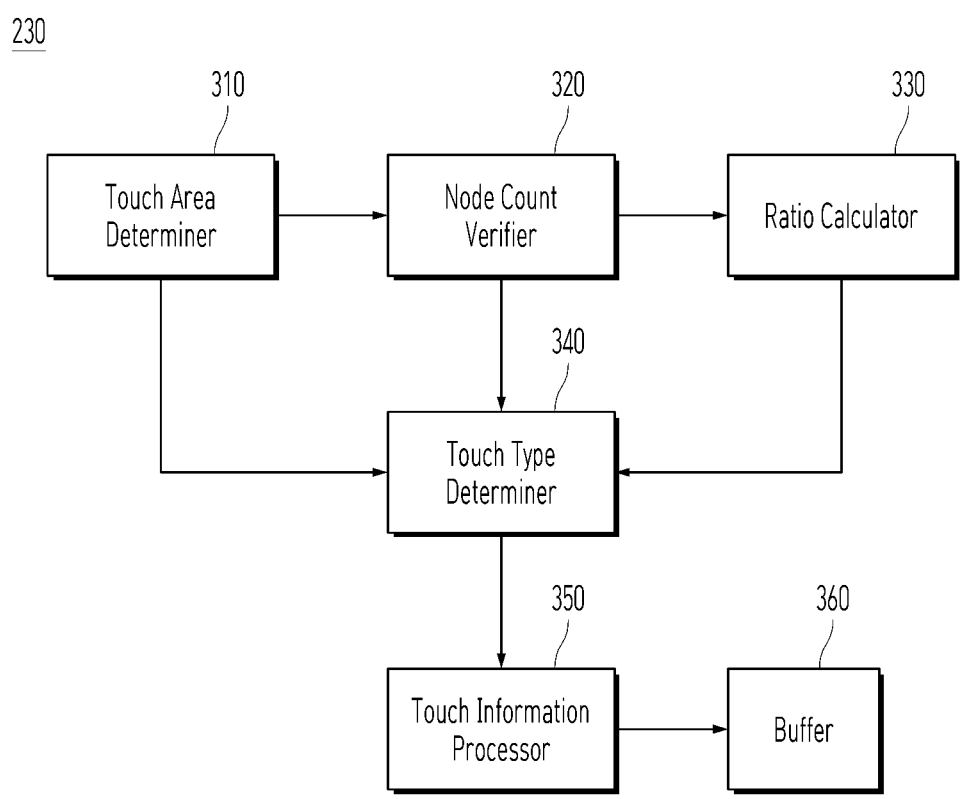
FIG. 3 is a block diagram illustrating the configuration of a touch determiner of FIG. 2.
Figure 4:
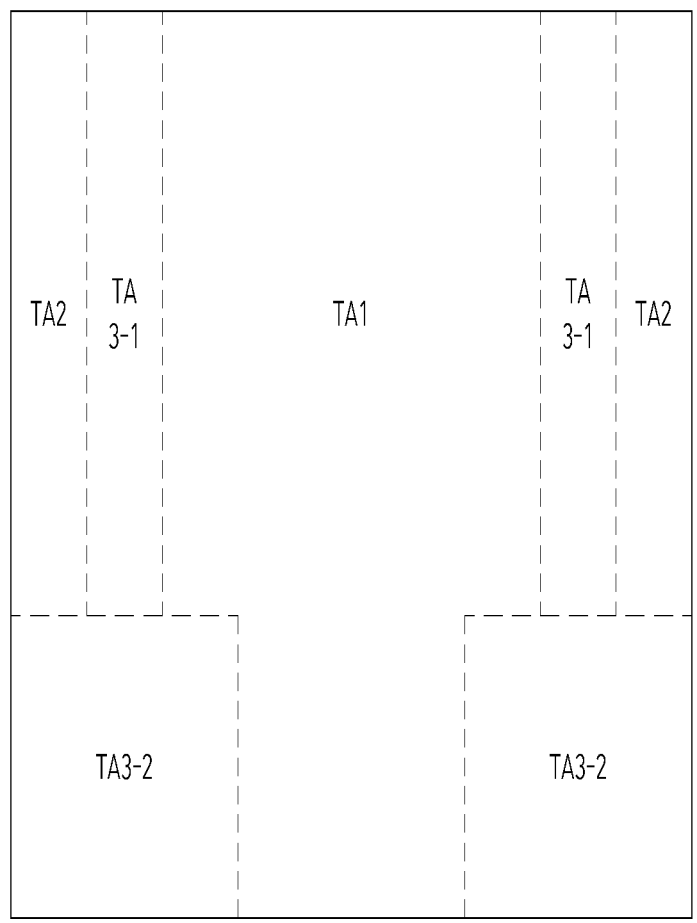
FIG. 4 is a diagram illustrating exemplary touch areas.
Figure 5:
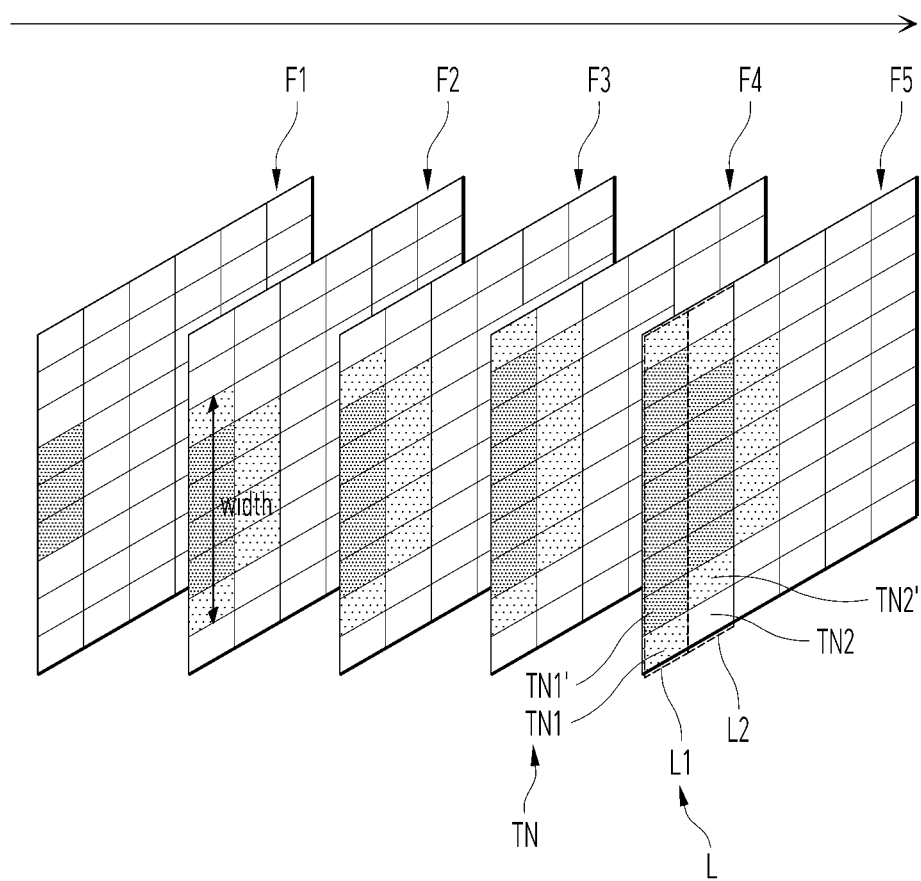
FIG. 5 is a diagram illustrating exemplary touch distribution for each frame.
Figure 6:
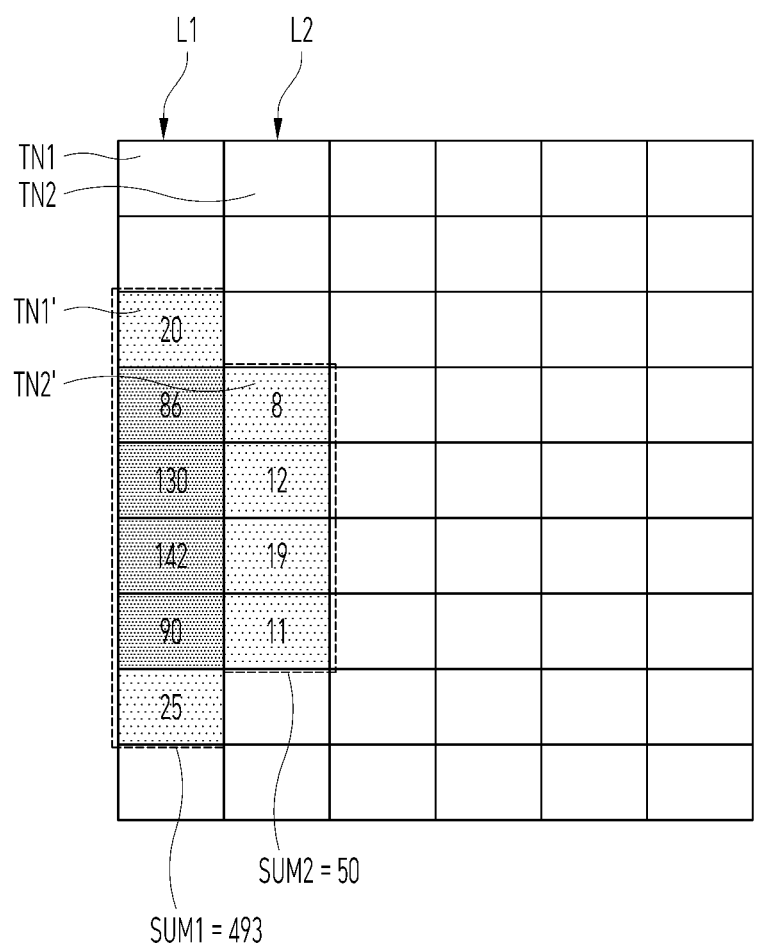
FIG. 6 is a diagram illustrating exemplary sensing values of touch nodes for a specific frame.

FIG. 2 is a block diagram schematically illustrating the configuration of a touch sensing device according to the present disclosure, and FIG. 3 is a block diagram illustrating the configuration of a touch determiner of FIG. 2. FIG. 4 is a diagram illustrating exemplary touch areas. FIG. 5 is a diagram illustrating exemplary touch distribution for each frame, and FIG. 6 is a diagram illustrating exemplary sensing values of touch nodes for a specific frame.

Referring to FIG. 2, the touch sensing device 170 includes the first circuit 171, the second circuit 172, and the third circuit 173.

The first circuit 171 selects a touch driving channel to output a driving signal TXS under the control of the third circuit 173 and supplies the driving signal TXS to the first touch lines Tx1 to Txj connected to the selected touch driving channel. For example, the first circuit 171 may sequentially supply the driving signal TXS to the first touch lines Tx1 to Txj. The first circuit 171 may be a touch driving circuit that supplies the driving signal TXS to the first touch electrodes through the first touch lines Tx1 to Txj.

The second circuit 172 selects a touch sensing channel to receive changes in the capacitance of the touch sensors, which are caused by a user touch, under the control of the third circuit 173. The second circuit 172 receives a sensing signal RXS including the changes in the capacitance of the touch sensors through the second touch lines Rx1 to Rxi connected to the selected touch sensing channel. The second circuit 172 samples the changes in the capacitance of the touch sensors received through the second touch lines Rx1 to Rxi, converts the capacitance changes into touch raw data, which is digital data, and then outputs the data. The second circuit 172 may be a touch sensing circuit that senses the changes in the capacitance of each touch sensor through the second touch lines Rx1 to Rxi.

The third circuit 173 may generate a touch driving setup signal to configure the touch driving channel, which is for the first circuit 171 to output the driving signal, and then output the touch driving setup signal to the first circuit 171. The third circuit 173 may generate a touch sensing setup signal to configure the touch sensing channel, which is for the second circuit 172 to receive the changes in the capacitance of the touch sensors, and then output the touch sensing setup signal to the second circuit 172. In addition, the third circuit 173 may generate timing control signals to control the operation timings of the first circuit 171 and second circuit 172 and output the timing control signals to the first circuit 171 and second circuit 172. The third circuit 173 may be a touch control circuit and may be implemented with a Micro Controller Unit (MCU).

The third circuit 173 may determine the presence of a touch and the coordinate thereof based on the capacitance changes. In this case, the third circuit 173 may distinguish between first and second touches, and in the case of the first touch, the third circuit 173 may output touch information including the touch coordinate. For example, the touch information may be touch coordinate data HIDxy provided to the host system 150.

As illustrated in FIG. 2, the third circuit 173 may include a touch signal processor 210, a coordinate calculator 220, and a touch determiner 230.

The touch signal processor 210 may generate sensing data including the sensing value of each of a plurality of touch nodes based on the capacitance changes. Specifically, the touch signal processor 210 may receive touch raw data from the second circuit 172. In this case, the touch raw data may be data obtained by sampling the changes in the capacitance of the touch sensors and converting the capacitance changes into digital data.

In other words, the touch signal processor 210 may generate the sensing data including the sensing value of each of the plurality of touch nodes based on the touch raw data. The plurality of touch nodes may correspond to the plurality of touch sensors provided on the panel 110.

The touch signal processor 210 may determine a difference obtained by comparing the touch raw data with a baseline as the sensing value. In this case, the baseline may refer to initial raw data for the plurality of touch nodes in an untouched state. The touch signal processor 210 may determine the difference between the initial raw data and touch raw data as the sensing value for each of the plurality of touch nodes. Additionally, the touch signal processor 210 may generate the sensing data including the sensing value of each of the plurality of touch nodes and transmit the sensing data to the coordinate calculator 220.

The coordinate calculator 220 may determine the presence of a touch and the coordinates thereof based on the sensing data. The coordinate calculator 220 may compare the sensing data with a predetermined touch reference value and determine the sensing data as touch input data if the sensing data is greater than or equal to the touch reference value. On the other hand, the coordinate calculator 220 may determine the sensing data as data with no touch input if the sensing data is smaller than the touch reference value.

The coordinate calculator 220 may calculate the touch coordinate for the touch input data by executing a predetermined touch coordinate calculation algorithm. The touch coordinate calculation algorithm may be implemented using any known algorithm.

The coordinate calculator 220 may transmit touch information including the touch input data and touch coordinate to the touch determiner 230. In this case, the touch input data may include the sensing value of each touch node where the touch presence is determined.

The touch determiner 230 determines touch types based on the touch input data and touch coordinate. The touch types include the first touch and second touch. The first touch may represent a normal touch intended by the user, and the second touch may represent a grip touch not intended by the user. The touch determiner 230 may determine one of the first touch and the second touch based on the touch ratio between lines arranged on the outside of the touched region.

Specifically, the touch determiner 230 includes a touch area determiner 310, a ratio calculator 330, a touch type determiner 340, and a touch information processor 350 as shown in FIG. 3. In one embodiment, the touch determiner 230 may further include at least one of a node count verifier 320 and a buffer 360.

The touch area determiner 310 determines a touch area based on the touch coordinate. Specifically, the touch area determiner 310 may determine the touch area where the touch coordinate is located. As shown in FIG. 4, the touch area may include a first touch area TA1, a second touch area TA2, and a third touch area TA3-1 or TA3-2.

The first touch area TA1 may correspond to an area where normal touches, i.e., intentional touches are predominantly input by the user to execute specific operations while using the display device 100.

The second touch area TA2 is an outer area located around the first touch area TA1. That is, the second touch area TA2 may correspond to an area where grip touches, i.e., unintended touches, which are primarily caused by holding or gripping rather than executing specific operations, occur frequently during the use of the display device 100. The second touch area TA2 may be positioned on at least part of the outside of the first touch area TA1. For example, the second touch area TA2 may be located on the left and right sides of the first touch area TA1 as shown in FIG. 4, but the present disclosure is not necessarily limited thereto. Alternatively, the second touch area TA2 may be positioned on the upper, lower, left, and right sides of the first touch area TA1 such that the second touch area TA2 surrounds the first touch area TA1.

The third touch area TA3-1 or TA3-2 is an area placed between the first touch area TA1 and the second touch area TA2. The third touch area TA3-1 or TA3-2 may correspond to an area where grip touches as well as normal touches frequently occur. The third touch area TA3-1 or TA3-2 may be positioned on at least part of the outside of the second touch area TA2 between the first touch area TA1 and the second touch area TA2. For example, the third touch area TA3-1 or TA3-2 may include: the third touch area TA3-1 positioned on the left or right side of the second touch area TA2 between the first touch area TA1 and the second touch area TA2; and the third touch area TA3-2 placed below the second touch area TA2, as shown in FIG. 4. However, the present disclosure is not necessarily limited thereto.

If the touch area where the touch coordinate is located is the third touch area TA3-1 or TA3-2, the touch area determiner 310 may provide the touch area to the ratio calculator 330 to determine the touch type based on the touch ratio between the touch nodes placed on each of the plurality of lines.

On the other hand, if the touch area where the touch coordinate is located is the first touch area TA1 or second touch area TA2, the touch area determiner 310 may provide the touch area to the touch type determiner 340 to determine the touch type based on the touch area.

If the touch coordinate is located within the third touch area TA3-1 or TA3-2, the ratio calculator 330 calculates the touch ratio between at least two lines among the plurality of lines L as shown in FIG. 5. Specifically, the ratio calculator 330 may calculate the touch ratio between touch nodes TN placed on each of at least two lines among the plurality of lines L. The plurality of touch nodes TN may correspond to the plurality of touch sensors provided in the panel 110.

The panel 110 includes the first touch electrodes arranged in a first direction (e.g., X-axis direction) and the second touch electrodes arranged in a second direction (e.g., Y-axis direction) that intersects the first direction (e.g., X-axis direction). The first direction (e.g., X-axis direction) may be parallel to the gate lines G1 to Gm, and the second direction (e.g., Y-axis direction) may be parallel to the data lines D1 to Dn. Mutual capacitance or self-capacitance related to the touch sensor may be formed in the intersection area between the first and second touch electrodes.

The panel 110 may include the plurality of touch sensors arranged along the plurality of lines L. The plurality of lines L may be lines extending in the second direction (e.g., Y-axis direction) as shown in FIG. 5, but the present disclosure is not necessarily limited thereto. The plurality of lines L may be lines extending in the first direction (e.g., X-axis direction), which may vary depending on the rotation of the panel 110. For example, when the panel 110 is displayed vertically, the plurality of lines L may be lines extending in the second direction (e.g., Y-axis direction). When the panel 110 is rotated 90 degrees and then displayed in the horizontal direction, the plurality of lines L may be lines extending in the first direction (e.g., the X-axis direction).

The ratio calculator 330 may calculate the touch ratio between a first line L1 and a second line L2 among the plurality of lines L. In this case, the first line L1 includes at least one of the leftmost line or the rightmost line, and the second line L2 may include a line located closest to the first line L1.

The ratio calculator 330 may calculate the touch ratio between a plurality of first touch nodes TN1 placed on the first line L1 and a plurality of second touch nodes TN2 placed on the second line L2. The ratio calculator 330 may calculate, as the touch ratio, the ratio between a first sum of the sensing values of the plurality of first touch nodes TN1 and a second sum of the sensing values of the plurality of second touch nodes TN2.

In this case, the ratio calculator 330 may calculate the first sum by summing the sensing values of first touch nodes TN1' that are touched among the plurality of first touch nodes TN1. In other words, the ratio calculator 330 may check the first touch nodes TN1' each having a sensing value greater than or equal to the touch reference value among the plurality of first touch nodes TN1. Then, the ratio calculator 330 may calculate the first sum by summing the sensing values of the checked first touch nodes TN1'.

In addition, the ratio calculator 330 may calculate the second sum by summing the sensing values of second touch nodes TN2' that are touched among the plurality of second touch nodes TN2. In other words, the ratio calculator 330 may check the second touch nodes TN2' each having a sensing value greater than or equal to the touch reference value among the plurality of second touch nodes TN2. Then, the ratio calculator 330 may calculate the second sum by summing the sensing values of the checked second touch nodes TN2'.

The ratio calculator 330 may calculate the ratio of the second sum to the first sum as the touch ratio.

For example, it is assumed that the sensing value for each of the plurality of touch nodes is defined as shown in FIG. 6. The ratio calculator 330 may calculate the first sum SUM1 by summing the sensing values of the first touch nodes TN1' that are touched among the plurality of first touch nodes TN1 placed on the first line L1. In this case, the ratio calculator 330 may calculate 493 as the first sum SUM1. In addition, the ratio calculator 330 may calculate the second sum SUM2 by summing the sensing values of the second touch nodes TN2' that are touched among the plurality of second touch nodes TN2 placed on the second line L2. In this case, the ratio calculator 330 may calculate 50 as the second sum SUM2. The ratio calculator 330 may determine that the touch ratio is about 0.1014, which is the ratio of the second sum to the first sum.

In one embodiment, the ratio calculator 330 may check the number of first touch nodes that are touched among the plurality of first touch nodes through the node count verifier 320. The ratio calculator 330 may calculate the touch ratio if the number of checked first touch nodes is greater than or equal to a predetermined first threshold. For example, the ratio calculator 330 may calculate the touch ratio if the number of touched first touch nodes is greater than or equal to 4.

The touch type determiner 340 determines the touch type based on the touch area determined by the touch area determiner 310 and the touch ratio calculated by the ratio calculator 330.

Specifically, if the touch area where the touch coordinate is located is the first touch area TA1 or second touch area TA2, the touch type determiner 340 may determine the touch type based on the touch area.

If the touch area is the first touch area TA1, the touch type determiner 340 may determine the touch type as the first touch.

If the touch coordinate is located within the second touch area TA2, the touch type determiner 340 may determine the touch type based on the presence of a touch in the previous frame and the touch area where the touch coordinate is located in the previous frame. If the touch area is the second touch area TA2 and if there is no touch in the previous frame, the touch type determiner 340 may determine the touch type as the second touch. If the touch area is the second touch area TA2, if there is a touch in the previous frame, and if the touch area in the previous frame is the second touch area TA2, the touch type determiner 340 may determine the touch type as the second touch. If the touch area is the second touch area TA2, if there is a touch in the previous frame, and if the touch area in the previous frame is not the second touch area TA2, the touch type determiner 340 may determine the touch type as the first touch.

If the touch area where the touch coordinate is located is the third touch area TA3-1 or TA3-2, the touch type determiner 340 may determine the touch type based on the touch ratio.

If the touch ratio is greater than or equal to a predetermined second threshold, the touch type determiner 340 may determine the touch type as the first touch. On the other hand, if the touch ratio is smaller than the second threshold, the touch type determiner 340 may determine the touch type as the second touch.

For example, if the touch ratio is greater than or equal to 0.8, the touch type determiner 340 may determine the touch type as the first touch. If the touch ratio is smaller than 0.8, the touch type determiner 340 may determine the touch type as the second touch. As shown in FIG. 6, when the first sum SUM1 of the sensing values of the touched first touch nodes TN1' is 493, and when the second sum SUM2 of the sensing values of the touched second touch nodes TN2' is 50, the touch ratio may be calculated to be about 0.1014. Since the touch ratio is smaller than 0.8, the touch type determiner 340 may determine the touch type as the second touch, that is, grip touch. If the second sum SUM2 of the sensing values of the plurality of second touch nodes TN2 placed on the second line L2 increases by 394, the touch type determiner 340 may determine the touch type as the first touch, that is, normal touch.

In one embodiment, the touch type determiner 340 may determine the touch type based on the number of first touch nodes checked by the node count verifier 320. If the number of checked first touch nodes is smaller than or equal to the first threshold, the touch type determiner 340 may determine the touch type as the first touch.

The touch information processor 350 processes touch information based on the touch type determined by the touch type determiner 340. If the touch type is determined as the first touch, the touch information processor 350 may output touch information including the touch coordinate. If the touch type is determined as the second touch, the touch information processor 350 may cancel the touch and output no touch information.

The touch information processor 350 may store information about processed touches in the buffer 360.

The buffer 360 may store history information for each frame. The history information may include the touch type. In one embodiment, the history information may further include at least one of the touch coordinate, the touch area, the number of touch nodes touched per line, or the touch ratio.

In one embodiment, the touch information processor 350 may process touch information based on the history information for each frame stored in the buffer 360. Specifically, when the touch type is determined as the first touch, the touch information processor 350 may check history information for at least two previous frames stored in the buffer 360. If the touch types for the at least two previous frames include the second touch, the touch information processor 350 may cancel the touch and output no touch information even if the touch type is the first touch.

For example, if the touch type is determined as the first touch, the touch information processor 350 may check history information for three previous frames stored in the buffer 360. In this case, the three previous frames may correspond to three consecutive previous frames from the corresponding frame. If the touch types for the three previous frames include the second touch, the touch information processor 350 may cancel the touch and output no touch information.

The touch sensing device 170 according to the embodiment of the present disclosure may determine either the first touch or the second touch as the touch type based on the touch ratio between the first line L1 and second line L2 in addition to the touched region.

For example, the touch distribution of each of a plurality of consecutively input frames F1, F2, F3, F4, and F5 may be defined as shown in FIG. 5. For the first frame F1, the conventional touch sensing device may determine the touch type as the second touch, that is, grip touch because the touch coordinate is located within the first touch area. If the touch coordinate is located within the second touch area, the conventional touch sensing device may determine whether the grip touch covers a large area by checking the width of the touched region. For the second frame F2, since the width of the touched region does not exceed a reference value, the conventional touch sensing device may determine the touch type as the first touch, that is, normal touch. However, even in the case of the grip touch, there may often be cases where the width of the touched region does not exceed the reference value within one frame. In this case, the width of the touched region in subsequently input frames may exceed the reference value. However, once the touch type is determined as the first touch, the conventional touch sensing device may not check whether subsequently input touches are the second touch. Even if the widths of the touched regions of the subsequently input touches exceed the reference value, the touches may not be recognized as the second touch. As a result, the conventional touch sensing device may fail to recognize the subsequently input touches as the second touch.

On the other hand, even if the width of the touched region in the second frame F2 does not exceed the reference value, the touch sensing device 170 according to the embodiment of the present disclosure may determine either the first touch or the second touch as the touch type based on the touch ratio between the first line L1 and second line L2. Specifically, since the touch ratio between the first sum SUM1 of the sensing values of the first touch nodes TN1' placed on the first line L1 and the second sum SUM2 of the sensing values of the second touch nodes TNT placed on the second line L2 is about 0.1014, which is smaller than the second threshold, as shown in FIG. 6, the touch sensing device 170 according to the embodiment of the present disclosure may determine the touch type as the second touch.

As described above, the touch sensing device 170 according to the embodiment of the present disclosure determines the touch type based on the touch ratio between the first line L1 and the second line L2 even if a touch does not have a large area, thereby identifying the touch intended by the user more accurately.

In addition, the touch sensing device 170 according to the embodiment of the present disclosure may stably determine the first touch or second touch for changes in sensitivity based on the history information for each frame stored in the buffer 360. Further, after determining the second touch, the touch sensing device 170 according to the embodiment of the present disclosure is configured to switch to the normal touch mode when the first touch is recognized in at least two or more frames, thereby preventing the grip touch mode from being released due to data glitches. In other words, even if data suddenly changes, the touch sensing device 170 according to the embodiment of the present disclosure may stably provide touch information by determining the touch type based on the history information for each frame.

FIGS. 7 to 13 are flowcharts for explaining a touch sensing method performed by the touch sensing device according to an embodiment of the present disclosure.

Figure 7:
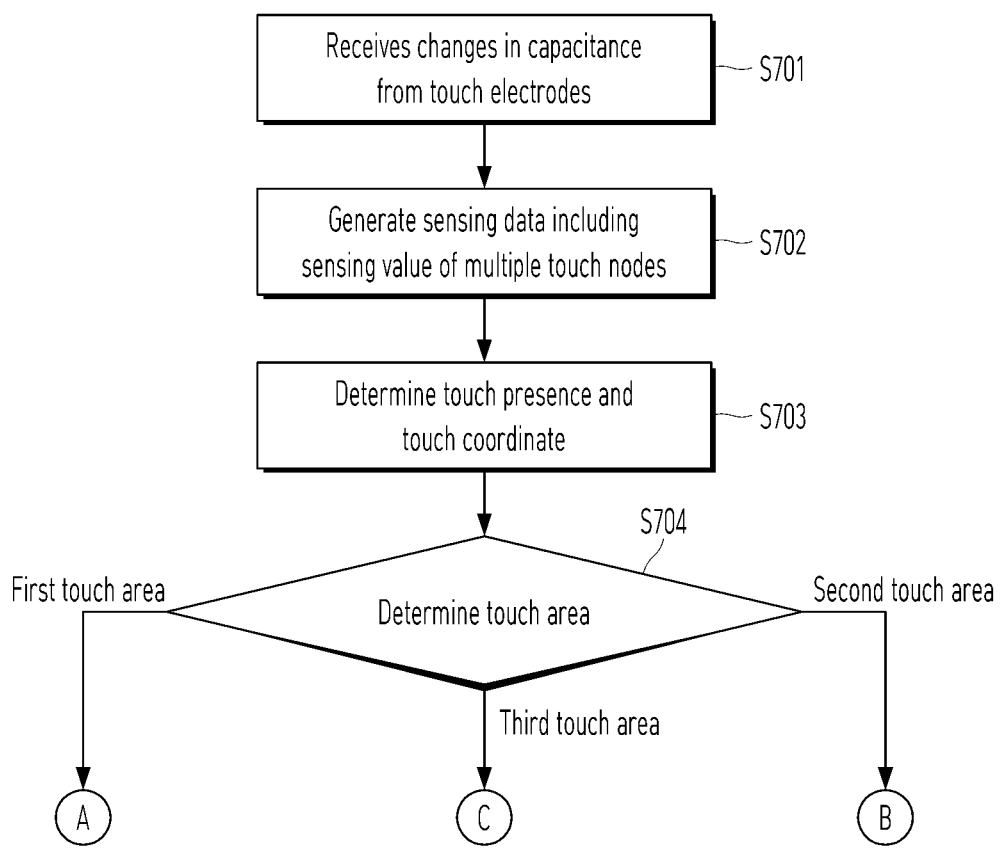
FIGS. 7 to 13 are flowcharts for explaining a touch sensing method performed by a touch sensing device according to an embodiment of the present disclosure.

Referring to FIG. 7, the touch sensing device 170 receives changes in capacitance from the touch electrodes (S701). Specifically, the touch sensing device 170 may supply a driving signal to the first touch electrodes through the first touch lines and receive changes in the capacitance of each of the touch sensors caused by a user's touch (referred to as "user touch") through the second touch lines.

Next, the touch sensing device 170 generates sensing data including the sensing value of each of the plurality of touch nodes based on the capacitance changes (S702).

Specifically, the touch sensing device 170 may sample the changes in the capacitance of the touch sensors received through the second touch lines and convert the capacitance changes into touch raw data, which is digital data. The touch sensing device 170 may generate the sensing data including the sensing value of each of the plurality of touch nodes based on the touch raw data. The touch sensing device 170 may determine a difference obtained by comparing the touch raw data with the baseline as the sensing value. As described above, the baseline may refer to initial raw data for the plurality of touch nodes in the untouched state. The touch sensing device 170 may determine the difference between the initial raw data and touch raw data as the sensing value for each of the plurality of touch nodes.

The touch sensing device 170 may determine the presence of a touch and the coordinates of the touch based on the sensing data (S703).

The touch sensing device 170 may compare the sensing data with the predetermined touch reference value and determine the sensing data as touch input data if the sensing data is greater than or equal to the touch reference value. On the other hand, the touch sensing device 170 may determine the sensing data as data with no touch input if the sensing data is smaller than the touch reference value.

The touch sensing device 170 may calculate the touch coordinate for the touch input data by executing the predetermined touch coordinate calculation algorithm. The touch coordinate calculation algorithm may be implemented using any known algorithm.

The touch sensing device 170 determines the touch area based on the touch coordinate (S704).

The touch sensing device 170 may determine the touch area where the touch coordinate is located as one of the first touch area TA1, the second touch area TA2, and the third touch area TA3-1 or TA3-2. The first touch area TA1 may correspond to an area where normal touches, i.e., intentional touches are predominantly input by the user to execute specific operations while using the display device 100. The second touch area TA2 is an outer area located around the first touch area TA1. That is, the second touch area TA2 may correspond to an area where grip touches, i.e., unintended touches, which are primarily caused by holding or gripping rather than executing specific operations, occur frequently during the use of the display device 100. The third touch area TA3-1 or TA3-2 is an area placed between the first touch area TA1 and the second touch area TA2. The third touch area TA3-1 or TA3-2 may correspond to an area where grip touches as well as normal touches frequently occur.

Next, the touch sensing device 170 may use the touch area to determine the type of the user touch (referred to as "touch type"). When the touch area is the first touch area TA1, the touch type may be determined according to a first process A. When the touch area is the second touch area TA2, the touch type may be determined according to a second process B. When the touch area is the third touch area TA3, the touch type may be determined according to a third process C.

Figure 8:
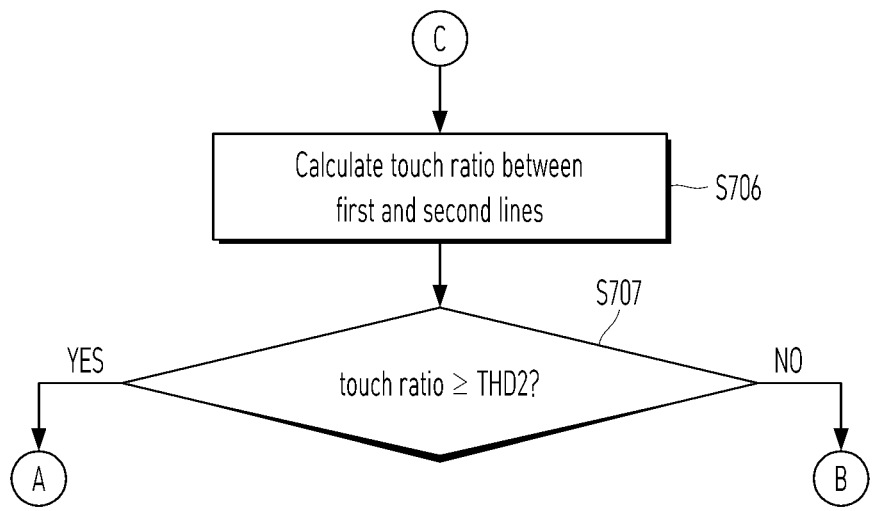
Figure 9:
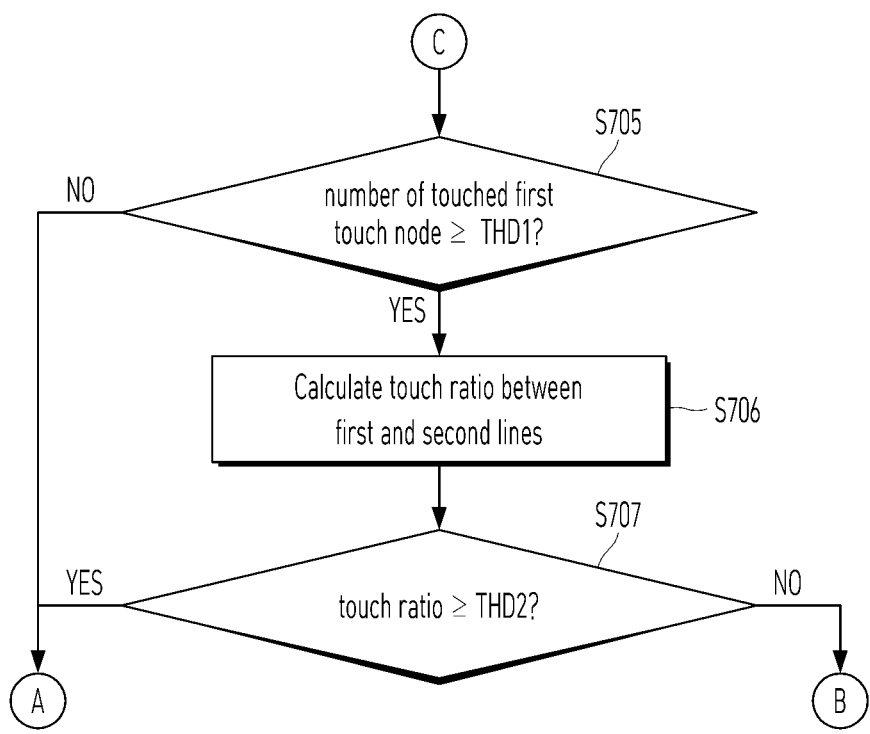

First, the third process C will be described with reference to FIG. 8.

If the touch area is the third touch area TA3, the touch sensing device 170 may calculate, as the touch ratio, the ratio between the first sum of the sensing values of the plurality of first touch nodes TN1 placed on the first line L1 and the second sum of the sensing values of the plurality of second touch nodes TN2 placed on the second line L2 (S706).

Specifically, the touch sensing device 170 may calculate the first sum by summing the sensing values of the first touch nodes TN1' that are touched among the plurality of first touch nodes TN1. The touch sensing device 170 may calculate the second sum by summing the sensing values of the second touch nodes TN2' that are touched among the plurality of second touch nodes TN2.

The touch sensing device 170 may calculate the ratio of the second sum to the first sum as the touch ratio.

If the touch ratio is greater than or equal to the predetermined second threshold, the touch sensing device 170 may determine the touch type according to the first process A (S707). On the other hand, if the touch ratio is smaller than the second threshold, the touch sensing device 170 may determine the touch type according to the second process B (S707).

Before considering the touch ratio, the number of touched first touch nodes TN1' among the plurality of first touch nodes TN1 placed on the first line L1 may be further considered. Hereinafter, modifications of the third process C of FIG. 8 will be described in detail with reference to FIG. 9.

If the touch area is the third touch area TA3, the touch sensing device 170 may check the number of first touch nodes TN1' that are touched among the plurality of first touch nodes TN1 placed on the first line L1. If the number of first touch nodes is smaller than the predetermined first threshold, the touch sensing device 170 may determine the touch type according to the first process A, without considering the touch ratio (S705).

However, if the number of first touch nodes is greater than or equal to the first threshold, the touch sensing device 170 may determine the touch type according to steps S706 and S707 described above with reference to FIG. 8. Since this has been previously explained, details will be omitted.

Hereinafter, the first process A will be described with reference to FIG. 10.

If the touch area is the first touch area TA1, the touch sensing device 170 may determine the touch type as the first touch (S708).

If the touch type is the first touch, the touch sensing device 170 may output touch information including the touch coordinate (S709).

The touch sensing device 170 may store information about the processed touch, that is, the user touch for which the touch information is output, in the buffer 360 (S712).

Hereinafter, the second process B will be described with reference to FIG. 11.

If the touch area is the second touch area TA2, the touch sensing device 170 may determine the touch type as the second touch (S710).

If the touch type is the second touch, the touch sensing device 170 may cancel (or ignore) the touch and output no touch information (S711).

The touch sensing device 170 may store information about the processed touch, that is, the user touch for which no touch information is output, in the buffer 360 (S712).

If the touch area is the first touch area TA1, it is not necessarily required that the touch type needs to be determined exclusively as the first touch. Even if the touch area is the first touch area TA1, the touch type may be determined as the second touch. In addition, if the touch area is the second touch area TA2, it is not necessarily required that the touch type needs to be determined exclusively as the second touch. Even if the touch area is the second touch area TA2, the touch type may be determined as the first touch. Hereinafter, modifications of the first process A of FIG. 10 will be described in detail with reference to FIG. 12, and modification of the second process B of FIG. 12 will be described in detail with reference to FIG. 13.

Figure 12:
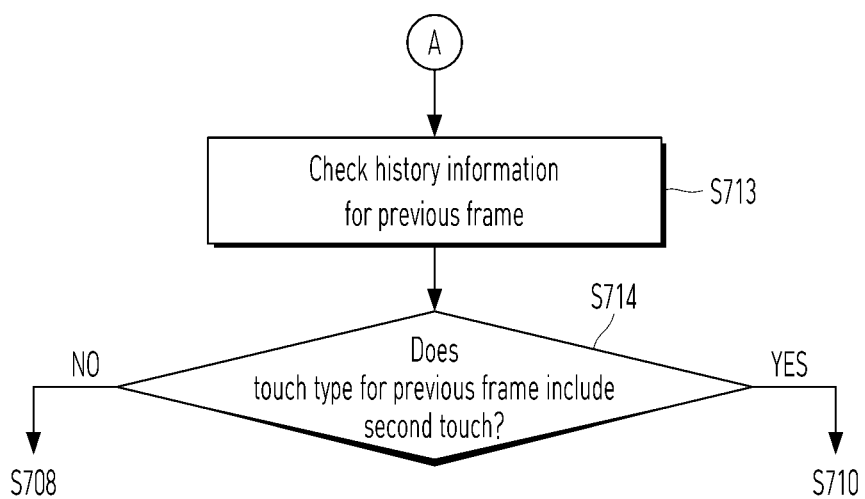

First, the modifications of the first process A will be explained with reference to FIG. 12.

If the touch area is the first touch area TA1, the touch sensing device 170 may determine the touch type based on history information for each frame stored in the buffer 360. Specifically, if the touch area is the first touch area TA1, the touch sensing device 170 may check history information for at least two previous frames stored in the buffer 360 (S713).

Figure 10:
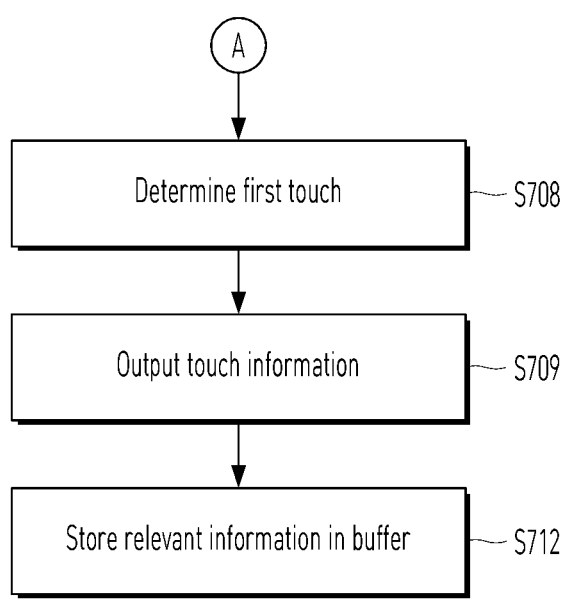

If the touch types for the at least two previous frames do not include the second touch, the touch sensing device 170 may proceed with step S708 of FIG. 10. That is, the touch sensing device 170 may determine the touch type as the first touch. The details of step S708 as well as the subsequent steps: steps S709 and S712 are the same as previously described.

Figure 11:
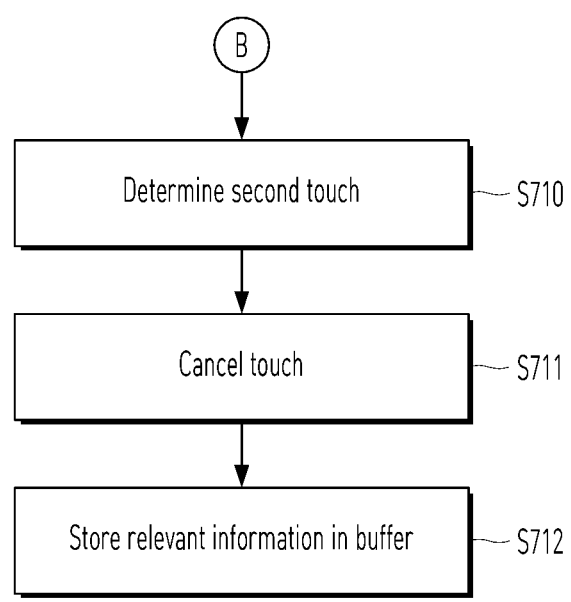

On the contrary, if the touch types for the at least two previous frames include the second touch, the touch sensing device 170 may proceed with step S710 of FIG. 11. That is, the touch sensing device 170 may determine the touch type as the second touch. The details of step S710 as well as the subsequent steps: steps S711 and S712 are the same as previously described.

Figure 13:
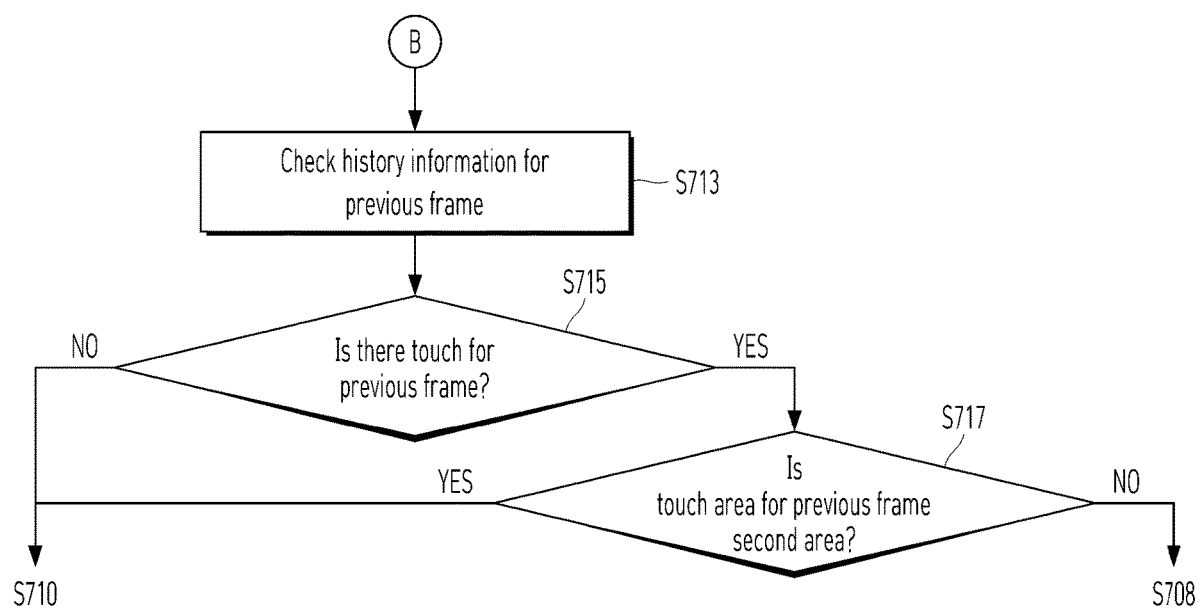

Next, the modification of the second process B will be described with reference to FIG. 13.

If the touch area is the second touch area TA2, the touch sensing device 170 may determine the touch type based on the history information for each frame stored in the buffer 360.

That is, if the touch area is the second touch area TA2, the touch sensing device 170 may determine the touch type based on the presence of a touch in the previous frame and the touch area where the touch coordinate is located in the previous frame. If the touch area is the second touch area TA2 and if there is no touch in the previous frame, the touch sensing device 170 may proceed with step S710 of FIG. 11. That is, the touch sensing device 170 may determine the touch type as the second touch.

If the touch area is the second touch area TA2, if there is a touch in the previous frame, and if the touch area in the previous frame is the second touch area TA2 [S717], the touch sensing device 170 may proceed with step S710 of FIG. 11. That is, the touch sensing device 170 may determine the touch type as the second touch.

The details of step S710 as well as the subsequent steps: steps S711 and S712 are the same as previously described.

If the touch area is the second touch area TA2, if there is a touch in the previous frame, and if the touch area in the previous frame is not the second touch area TA2 [S717], the touch sensing device 170 may proceed with step S708 of FIG. 10. That is, the touch sensing device 170 may determine the touch type as the first touch. The details of step S708 as well as the subsequent steps: steps S709 and S712 are the same as previously described.

It will be appreciated by those skilled in the art to which the present disclosure pertains that the disclosure described above may be practiced in other specific forms without altering the technical ideas or essential features thereof.

Furthermore, the methods as described in the present disclosure may be implemented, at least partially, using one or more computer programs or components. Such a component may be provided as a series of computer instructions on a computer-readable medium or machine-readable medium including volatile and non-volatile memory. The instructions may be provided as software or firmware. Alternatively, the instructions and may be implemented in whole or in part in hardware components such as Application-Specific Integrated Circuits (ASICs), Field-Programmable Gate Arrays (FPGAs), Digital Signal Processors (DSPs), or other similar devices. The instructions may be configured to be executed by one or more processors or other hardware components. The processors or other hardware components may perform or be configured to perform all or some of the methods and procedures as disclosed in the present disclosure when executing the series of computer instructions.

The present disclosure is not limited to the above-described embodiments and the attached drawings. It will be apparent to those skilled in the art to which the present disclosure pertains that various substitutions, modifications, and alterations are possible without departing from the technical spirit of the present disclosure. Therefore, the scope of the present disclosure is defined by the claims set forth below, and all modifications or variations derived from the meaning and scope of the claims and equivalent concepts should be considered to be within the scope of the disclosure.

What is claimed is:

1. A touch sensing device comprising:
   a first circuit configured to supply a driving signal to a touch electrode of a panel;
   a second circuit configured to sense a change in capacitance of the touch electrode; and
   a third circuit including:
      a touch signal processor configured to generate sensing data including a sensing value for each touch node based on the sensed capacitance change;
      a coordinate calculator configured to calculate a touch presence and a touch coordinate based on the sensing data; and
      a touch determiner configured to determine a user touch as either a normal touch or a grip touch based on a touch ratio between touch nodes placed on each of a plurality of lines of the panel and a touch area,
   wherein the touch determiner includes:
      a touch area determiner configured to determine the touch area based on the touch coordinate, wherein the touch area has a first touch area, a second touch area located around the first touch area, and a third touch area placed between the first touch area and the second touch area; and
      a ratio calculator configured to calculate the touch ratio between touch nodes placed on each of at least two lines among the plurality of lines when the touch coordinate is located within the third touch area.

2. The touch sensing device of claim 1, wherein the third circuit is configured to:
   output touch information including the calculated touch coordinate based on that the user touch is determined as the normal touch; or
   skip outputting the touch information based on that the user touch is determined as the grip touch.

3. The touch sensing device of claim 1, wherein the touch ratio is a touch ratio between a plurality of first touch nodes placed on a first line among the plurality of lines and a plurality of second touch nodes placed on a second line among the plurality of lines.

4. The touch sensing device of claim 3, wherein the third circuit is configured to:
   calculate a ratio between a first sum of sensing values of the plurality of first touch nodes and a second sum of sensing values of the plurality of second touch nodes as the touch ratio; and
   determine the user touch as the normal touch based on that the touch ratio is greater than or equal to a first threshold.

5. The touch sensing device of claim 4, wherein the third circuit is configured to:
   calculate the first sum by summing sensing values of touched first touch nodes among the plurality of first touch nodes; and
   calculate the second sum by summing sensing values of touched second touch nodes among the plurality of second touch nodes.

6. The touch sensing device of claim 3, wherein the first line comprises at least one of a leftmost line or a rightmost line, and
   wherein the second line comprises a line located closest to the first line.

7. The touch sensing device of claim 3, wherein the third circuit is configured to:
   determine the user touch as the normal touch based on that a number of touched first touch nodes among the plurality of first touch nodes is smaller than a second threshold; or
   determine the user touch as either the normal touch or the grip touch depending on the touch ratio based on that the number of the touched first touch nodes among the plurality of first touch nodes is greater than or equal to the second threshold.

8. The touch sensing device of claim 1, wherein the panel comprises the first touch area, the second touch area, and the third touch area, and
wherein the third circuit is configured to determine the touch area as one of the first touch area, the second touch area, and the third touch area based on the touch coordinate.

9. The touch sensing device of claim 8, wherein the third circuit is configured to determine the user touch as the grip touch based on that the touch area is the second touch area.

10. The touch sensing device of claim 8,
wherein the third circuit is configured to:
determine the user touch as the normal touch based on that the touch area is the first touch area;
determine the user touch as either the normal touch or the grip touch depending on the touch ratio based on that the touch area is the third touch area.

11. The touch sensing device of claim 8, further comprising a buffer configured to store history information including a touch type representing either the normal touch or the grip touch for each frame.

12. The touch sensing device of claim 11, wherein the third circuit is configured to:
check the history information stored in the buffer for at least one previous frame based on that the touch area is the first touch area.

13. The touch sensing device of claim 12, wherein the third circuit is configured to:
determine the user touch as the grip touch based on that the touch type for the at least one previous frame is the grip touch, or
determine the user touch as the normal touch based on that the touch type for the at least one previous frame is not the grip touch.

14. The touch sensing device of claim 11, wherein the third circuit is configured to:
check the history information stored in the buffer for at least one previous frame based on that the touch area is the second touch area; and
determine the user touch as the grip touch based on that there is no touch history for the at least one previous frame.

15. The touch sensing device of claim 1, wherein the touch determiner further includes:
a touch type determiner configured to determine a touch type based on the touch area determined by the touch area determiner and the touch ratio calculated by the ratio calculator, and
a touch information processor configured to process touch information based on the touch type determined by the touch type determiner.

16. A touch sensing method comprising:
supplying a driving signal to a touch electrode of a panel;
sensing a change in capacitance of the touch electrode;
generating a sensing data including a sensing value for each of touch node based on the sensed capacitance change;
calculating a touch presence and a touch coordinate based on the sensing data; and
determining a user touch as either a normal touch or a grip touch based on a touch ratio between touch nodes placed on each of a plurality of lines of the panel and a touch area,
wherein the determining the user touch includes;
determining the touch area based on the touch coordinate, wherein the touch area has a first touch area, a second touch area located around the first touch area, and a third touch area placed between the first touch area and the second touch area; and
calculating the touch ratio between touch nodes placed on each of at least two lines among the plurality of lines when the touch coordinate is located within the third touch area.

17. The touch sensing method of claim 16, comprising:
outputting touch information including the calculated touch coordinate based on that the user touch is determined as the normal touch; or
skipping outputting the touch information based on that the user touch is determined as the grip touch.

18. The touch sensing method of claim 16, wherein the touch ratio is a touch ratio between a plurality of first touch nodes placed on a first line among the plurality of lines and a plurality of second touch nodes placed on a second line among the plurality of lines.

19. The touch sensing method of claim 18, wherein the determining the user touch as either the normal touch or the grip touch comprises:
calculating a ratio between a first sum of sensing values of the plurality of first touch nodes and a second sum of sensing values of the plurality of second touch nodes as the touch ratio; and
determining the user touch as the normal touch based on that the touch ratio is greater than or equal to a first threshold.

20. The touch sensing method of claim 18, wherein the determining the user touch as either the normal touch or the grip touch comprises:
checking a number of touched first touch nodes among the plurality of first touch nodes; and
determining the user touch as the grip touch based on that the number of the touched first touch nodes among the plurality of first touch nodes is smaller than a second threshold; or
determining the user touch as either the normal touch or the grip touch depending on the touch ratio based on that the number of the touched first touch nodes among the plurality of first touch nodes is greater than or equal to the second threshold.

21. The touch sensing method of claim 16, wherein the panel comprises the first touch area, the second touch area, and the third touch area, and
wherein the touch area is determined as one of the first touch area, the second touch area, and the third touch area based on the touch coordinate.

* * * * *